J. AEBI.
CONSTANT PRESSURE PLUNGER.
APPLICATION FILED APR. 2, 1921.
1,411,148.
Patented Mar. 28, 1922.
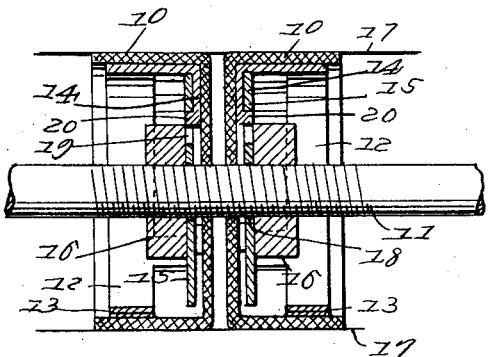
Fig. 1.
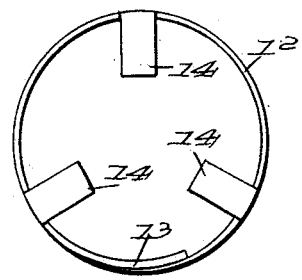
Fig. 2.
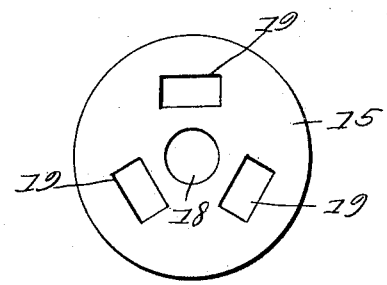
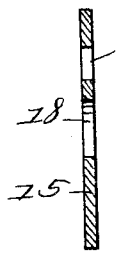
Fig. 3.
Fig. 4.
Inventor
John Aebi.
By
Attorney

UNITED STATES PATENT OFFICE.

JOHN AEBI, OF ALLIANCE, OHIO.

CONSTANT-PRESSURE PLUNGER.

1,411,148.   Specification of Letters Patent.   Patented Mar. 28, 1922.

Application filed April 2, 1921. Serial No. 458,131.

*To all whom it may concern:*

Be it known that I, JOHN AEBI, a citizen of the United States, residing at Alliance, in the county of Stark and State of Ohio, have invented a new and useful Constant-Pressure Plunger, of which the following is a specification.

The object of the invention is to provide a plunger, more particularly of the double-acting type, whereby a constant and uniform pressure of the gasket against the walls of the cylinder is maintained to insure the maximum efficiency of operation without undue resistance or wear and under conditions adapting the parts to compensate for wear, shrinkage or other variation of the gasket; and with this object in view the invention consists in a construction and combination of parts of which a preferred embodiment is shown in the accompanying drawings, wherein:—

Figure 1 is a sectional view of a plunger head embodying the invention.

Figure 2 is a plan view of one of the expansion rings.

Figure 3 is a sectional view taken transversely of one of the retaining disks.

Figure 4 is a plan view of a retaining disk.

The plunger head which is illustrated in the drawing is of the double-acting type designed to impel fluid in both directions or to act correspondingly in movement in opposite directions and to that end it consists of a plurality of oppositely facing cup shaped gaskets 10 of the ordinary or commercial type carried by the plunger stem 11 and respectively fitted internally with split expansion rings 12 preferably having overlapping terminals 13 and provided with inwardly directed radial arms 14 upon which rest retainer disks 15 held in place by the nuts 16 which are threaded on the stem 11.

The expanding rings 12 are of resilient or spring material having an expanding tendency serving to maintain the flanges or side portions of the gaskets in yielding contact with the surface of the cylinder wall which is indicated by the line 17 in Figure 1 and the expansive action of the rings is possible without displacement longitudinally of the path of movement of the plunger by reason of the retaining disks which in addition to being provided with a central opening indicated at 18 are provided with annular series of openings 19 for the reception of upturned lips 20 at the inner ends of the radial arms 14 of the expanders, which openings 19 permit radial movement of the lips while preventing bodily displacement of the expanders, even when the plunger is removed from the cylinder.

Having described the invention, what is claimed as new and useful is:

1. A plunger having a stem and cup shaped gasket, a split ring expander fitted with the gasket and provided in inwardly directed radial arms, a retaining disk arranged within the expander in bearing relation with said arms, and held in place by a nut threaded on the stem and holding the retaining disk in place.

2. A plunger having a stem and cup shaped gasket, a split ring expander fitted with the gasket and provided in inwardly directed radial arms, a retaining disk arranged within the expander in bearing relation with said arms, and held in place by a nut threaded on the stem, the terminals of the split ring forming the expander being arranged in overlapping relation and holding the retaining disk in place.

3. A plunger having a stem and cup shaped gasket, a split ring expander fitted with the gasket and provided in inwardly directed radial arms, a retaining disk arranged within the expander in bearing relation with said arms, and held in place by a nut threaded on the stem, the retaining disk being provided with openings and the said arms with upturned lips projecting into said openings and holding the retaining disk in place.

4. A double-acting plunger having a stem, oppositely facing cup shaped gaskets, split expansion rings respectively fitted in said gaskets and provided with radial inwardly directed spacing arms, retaining disks having bearing relations with said arms, and nuts threaded upon the stem in bearing relation with the retaining disks.

JOHN AEBI.